(12) United States Patent
Huybrechts et al.

(10) Patent No.: US 7,578,202 B2
(45) Date of Patent: *Aug. 25, 2009

(54) PIPELINE WITH INTEGRATED FLOW METER

(75) Inventors: Dirk Huybrechts, Heidelberg (DE); Paul Szasz, Plankstadt (DE)

(73) Assignee: ABB AG, Mannheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/794,816

(22) PCT Filed: Jan. 20, 2006

(86) PCT No.: PCT/EP2006/000496

§ 371 (c)(1),
(2), (4) Date: Jul. 6, 2007

(87) PCT Pub. No.: WO2006/077133

PCT Pub. Date: Jul. 27, 2006

(65) Prior Publication Data

US 2008/0022781 A1 Jan. 31, 2008

(30) Foreign Application Priority Data

Jan. 21, 2005 (DE) .................. 10 2005 002 905

(51) Int. Cl.
*G01F 1/58* (2006.01)
(52) U.S. Cl. .................................. 73/861.12
(58) Field of Classification Search .............. 73/861.12, 73/861.15
See application file for complete search history.

(56) References Cited

U.S. PATENT DOCUMENTS

| 3,406,569 | A | | 10/1968 | Rohmann | |
|---|---|---|---|---|---|
| 3,479,871 | A | | 11/1969 | Cushing | |
| 3,608,375 | A | * | 9/1971 | Cushing | 73/861.12 |
| 3,824,856 | A | | 7/1974 | Yard | |
| 4,098,118 | A | * | 7/1978 | Schmoock | 73/861.12 |
| 4,181,018 | A | | 1/1980 | Schmoock | |
| 4,214,477 | A | * | 7/1980 | Schmoock | 73/861.12 |
| 4,567,775 | A | * | 2/1986 | Schmoock | 73/861.12 |
| 4,741,215 | A | | 5/1988 | Bohn et al. | |
| 4,774,844 | A | | 10/1988 | Davis | |

(Continued)

FOREIGN PATENT DOCUMENTS

DE        1 924 152 U        9/1965

(Continued)

OTHER PUBLICATIONS

International Preliminary Report on Patentability and English translation of the Written Opinion issued in PCT/EP2006/000496; Jul. 24, 2007; EPO, Geneva, CH.

(Continued)

*Primary Examiner*—Harshad Patel
(74) *Attorney, Agent, or Firm*—Buchanan Ingersoll & Rooney PC

(57) ABSTRACT

The invention related to a flow meter for measuring the flow rate of a fluid flowing in a pipe according to the magnetic-inductive method. To this end, the flow meter comprises the pipe itself as well as an electrode arrangement integrated in the pipe and a magnetic system also integrated in the pipe for generating the measuring/magnetic field.

5 Claims, 3 Drawing Sheets

U.S. PATENT DOCUMENTS

Figure 1:
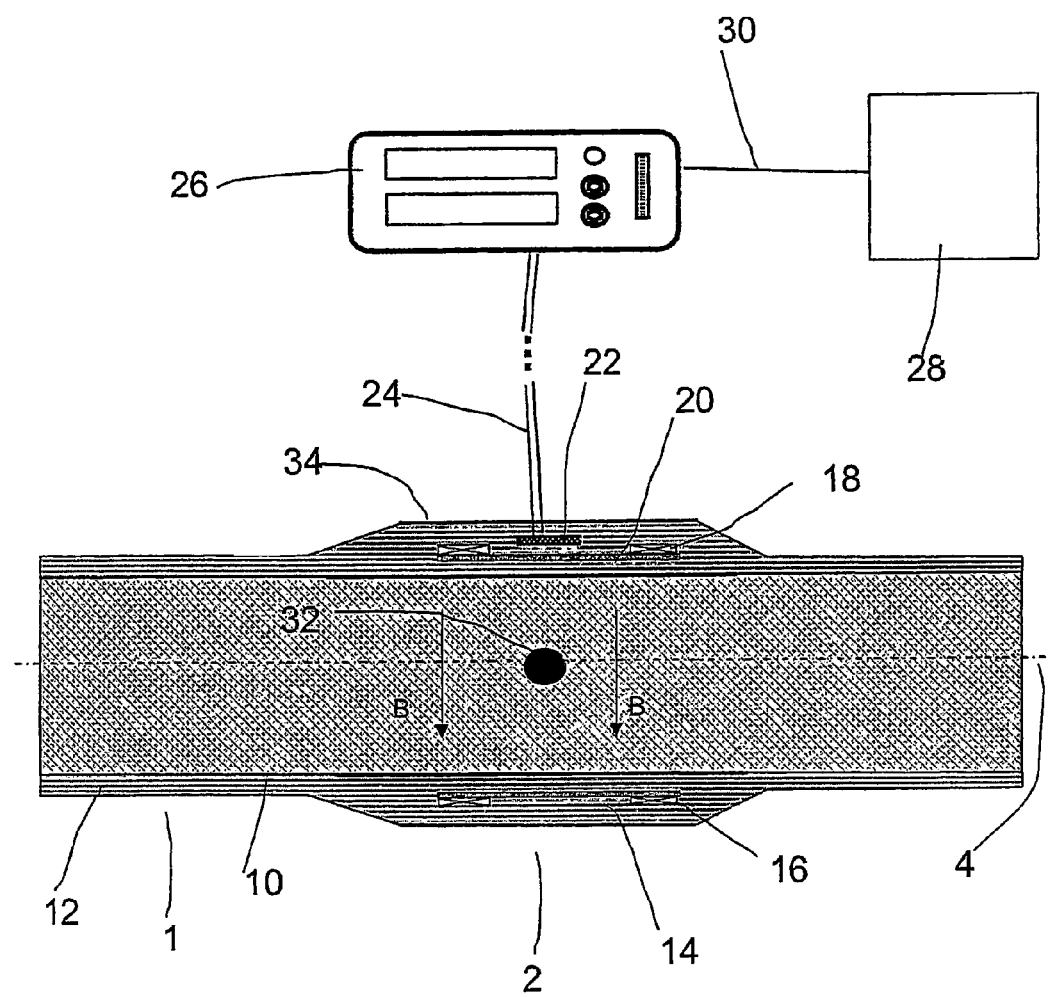

| | | | | |
|---|---|---|---|---|
| 5,297,425 | A | * | 3/1994 | Hamby et al. ............ 73/861.17 |
| 5,388,455 | A | | 2/1995 | Hamby et al. |
| 5,731,527 | A | * | 3/1998 | Van Cleve ............ 73/861.355 |
| 5,925,830 | A | * | 7/1999 | Schalk .................... 73/861.12 |
| 6,983,661 | B2 | * | 1/2006 | Zingg ...................... 73/861.12 |
| 7,344,667 | B2 | * | 3/2008 | Honma et al. ............... 264/136 |

FOREIGN PATENT DOCUMENTS

| | | |
|---|---|---|
| DE | 33 29 689 A1 | 3/1984 |
| DE | 38 23 614 A1 | 1/1990 |
| DE | 197 08 857 A1 | 7/1998 |
| DE | 103 47 878 A1 | 5/2005 |
| DE | 103 47 890 A1 | 5/2005 |
| EP | 1 207 374 A1 | 5/2002 |
| EP | 1 300 658 A2 | 4/2003 |

OTHER PUBLICATIONS

International Search Report.
German Search Report.

* cited by examiner

PIPELINE WITH INTEGRATED FLOW METER

The invention relates to a flow meter for measuring the flow of a fluid flowing in a pipeline by the magnetic-inductive method.

Magnetic-inductive flow meters known in the current state of the art comprise special magnetic-inductive measuring devices, which, when in use, are fitted in the pipeline in which they are intended to measure the flow of a flowing fluid substance. The fitting of the magnetic-inductive measuring devices is in this case performed by means of flange connections, or else by means of flangeless fitting (known as wafer fitting).

The basic construction and operating principle of magnetic-inductive measuring devices are described for example in the Lexikon der Mess-und Automatisierungstechnik [Lexicon of measuring and automation technology], by Elmar Schrüfer, VDI-Verlag, Düsseldorf 1992, pages 262-263. On the basis of the operating principle, magnetic-inductive measuring devices can only be used for measuring the flow of electrically conductive fluid substances. Fluid substances are primarily understood here as meaning a liquid, but could also be a gas. Today, there are also known devices in which, in addition to the flow measurement, a detection as to whether the measuring pipe is completely filled, partially filled or not filled also takes place.

Magnetic-inductive measuring devices are used in particular in a series of industrial process installations, for example in the area of water management (flow measurement in drinking water preparation and wastewater treatment), in the area of the chemical and petrochemical industry (flow measurement of water, acids, alkaline solutions, etc.) in the area of the pharmaceutical industry and in the area of the food industry (flow measurement of water, juices, beer, milk products, etc.).

The flanges required in the case of known magnetic-inductive flow meters represent a considerable cost factor. A further cost factor is the necessity for known magnetic-inductive flow measuring devices to be fitted at specific fitting locations in the process pipeline in which measurement is to be performed. For this purpose, the process pipeline has to be cut open, a piece of pipe that corresponds in its length to the length of the magnetic-inductive measuring device is removed from the process pipeline and in its place the magnetic-inductive measuring device is inserted into the process pipeline and connected to it again in a fluid-tight manner. Altogether, this procedure for the installation of a magnetic-inductive flow meter is very laborious.

It is therefore the object of the present invention to provide a magnetic-inductive flow meter for which it is possible to provide simpler and lower-cost installation and construction.

The object is achieved by a flow meter of the generic type. According to the invention, the flow meter therefore comprises the pipeline itself as well as an electrode arrangement integrated in the pipeline and a magnetic system integrated in the pipeline for generating the measuring magnetic field.

The advantage of a flow meter according to the invention is that a separate magnetic-inductive flow measuring device no longer has to be retrofitted in the pipeline, but instead the process pipeline itself is used virtually as a measuring device. The process pipeline is in this case provided at specific locations with flow measuring functionality by integration of an electrode arrangement and a magnetic system in the pipeline. In the case of a flow meter according to the invention, there is no longer the necessity to cut open the pipeline to create the measuring location. This is so since the measuring location is already created in the piece of pipeline by integration of the electrode arrangement and the magnetic system in the pipeline itself. The installation of the pipeline system in the process plant consequently also automatically sets up the flow meter.

In an advantageous refinement of the invention, the flow meter also additionally comprises an electronic signal converter or signal transmission assembly integrated in the pipe wall. The signal converter or signal transmission assembly may comprise, for example, an impedance converter and a signal preamplifier or a filter assembly, in a way similar to assemblies for transmitting the measured signals to a process control center. The signal transmission may in this case be performed for example by two—or four-conductor technology, but also by means of a field bus system. The flow measuring locations created in the process pipeline system by a flow meter according to the invention can consequently be linked and interconnected with the process control panel or the process control level in a way that is known in principle. It goes without saying that signal transmission assemblies for wireless signal transmission may also be integrated in the pipe wall.

In a particularly advantageous embodiment, the flow meter according to the invention comprises a pipeline made of plastic. This may in particular also be formed from a fiber composite material and produced by a winding technique.

The advantages of a flow meter according to the invention also come into effect in particular in an embodiment in which the electrode arrangement comprises conductive regions of the pipeline bounding surface on the substance side. This pipeline bounding surface on the substance side will generally be the inside wall of the pipeline. In some cases, it may also be that the pipeline is lined on the inside with a so-called liner layer, the liner being used to achieve high corrosion resistance. For the highest corrosion resistance requirements, such liners are produced for example from PTFE plastic or a similarly suitable material. A person skilled in the art knows of methods for making such plastic pipes electrically conductive in certain zones, in particular also pipes made of fiber composite materials. The contacting of these electrode arrangements integrated in such a way in the pipeline with the signal converter or signal transmission assembly takes place for example by means of electrical connecting lines—likewise embedded in the pipeline.

It is particularly advantageous if the magnetic system and/or the electrode arrangement is already wound into the pipe wall during the production of the pipeline or integrated in some other way. This then creates as it were an "intelligent" pipeline with an integrated flow measuring location.

A flow meter according to the invention may, however, also be retrofitted on an existing pipeline. If this pipeline is formed from a fiber composite material by a winding technique, the magnetic system and the electrode arrangement can be subsequently applied to or incorporated in the pipeline at any location selected for it—without cutting the pipeline open—and subsequently be wrapped with layers of fiber composite material. It is then merely that the pipeline wall is thickened by a small amount at the measuring location created in this way. The connecting lines of the electronic signal converter and/or signal transmission assembly may then protrude from the pipeline wall, so that they are accessible from the outside.

Further advantageous refinements of the invention and further advantages can be taken from the exemplary embodiments described.

Figure 2:
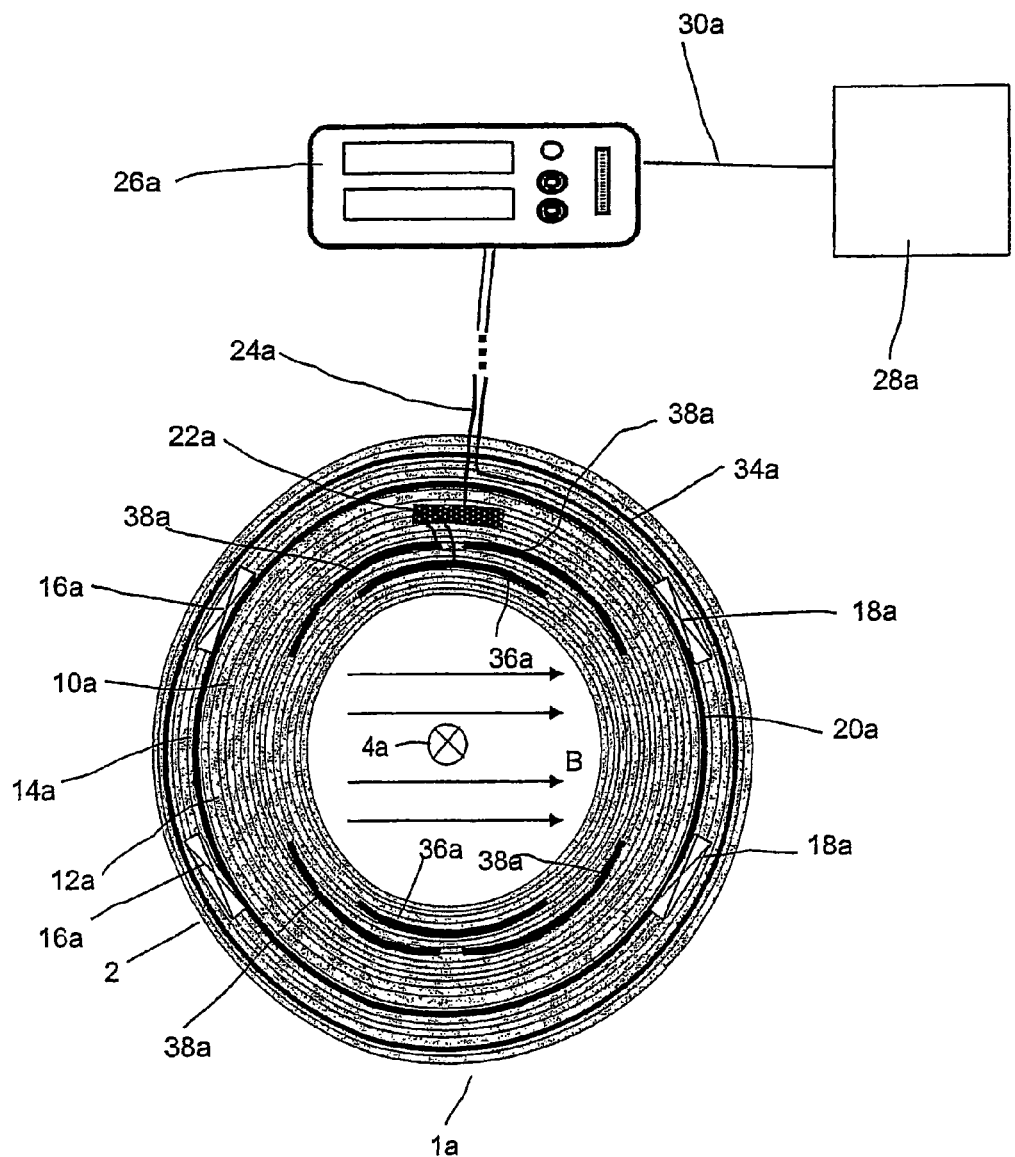
Figure 3:
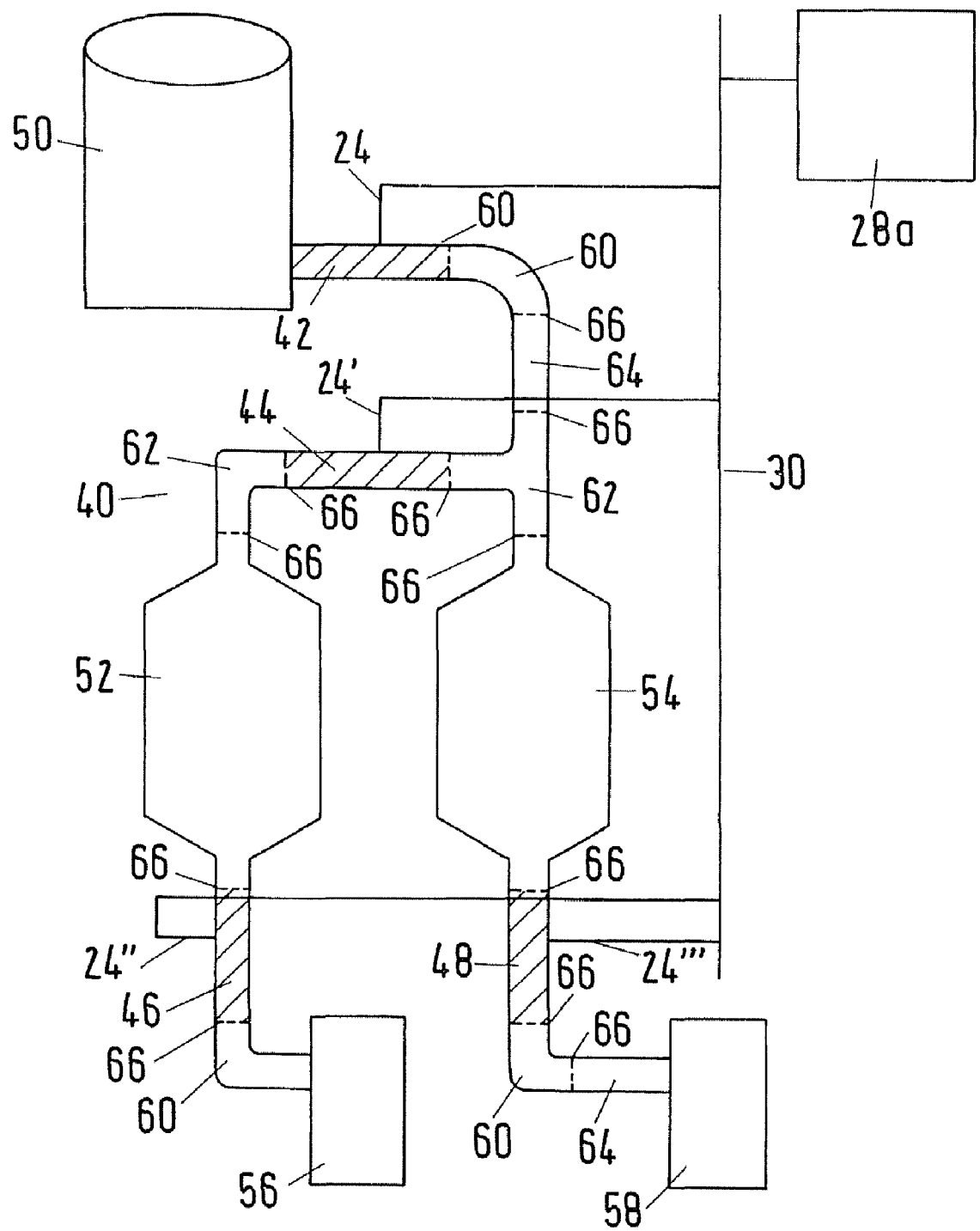

The invention and further advantageous refinements of the invention are to be explained and described in more detail on the basis of the drawings, in which three exemplary embodiments of the invention are represented and in which:

FIG. 1 shows a first embodiment of a magnetic-inductive flow measuring system according to the invention, with conductive signal pickup and with a magnetic system also wound into a pipeline of fiber composite material during its production, schematically in longitudinal section;

FIG. 2 shows a second embodiment of a magnetic-inductive flow measuring system according to the invention, with capacitive signal pickup and with a magnetic system also wound into a pipeline of fiber composite material during its production, schematically in cross section, and FIG. 3 shows a schematic, exemplary representation of a process engineering plant with a pipeline system, in which electrode systems are integrated and magnetic systems are fitted in the pipe wall on four component pieces of pipeline.

FIG. 1 shows a detail of a process pipeline 1, the pipe wall of which is produced from a fiber composite material by a winding technique. Individual layers of semifinished fiber material 10 form a material composite with a synthetic resin 12. FIG. 1 shows a longitudinal section through the piece of pipeline, with the layering indicated by parallel lines. To produce the pipeline from fiber composite material, any method known in composite technology can be applied in an adapted form. Typical thicknesses of individual fiber composite material layers are of the order of magnitude of 0.12 mm to 3 mm.

In the zone 2 of the piece of pipeline 1 that is selected as the measuring location, a magnetic system 14 is integrated in the pipe wall, in that it has been wound into the layers of fiber composite material during the production of the pipeline. The magnetic system 14 comprises two circular exciting coils 16, 18 and a ferromagnetic core 20 for the magnetic return. The winding planes of the circular exciting coils 16, 18 run parallel to one another and to the center axis 4 of the pipe. Because of the longitudinal sectional representation, only the sectional areas of the circular coils 16, 18 can be seen.

The ferromagnetic core 20 comprises a flexible ferromagnetic metal sheet, which between the two coils 16, 18 follows an inner lateral surface of the cylinder of the piece of pipeline 1, and consequently ensures the magnetic return flow, and is embedded in the layers of fiber composite material. Here, the exciting coils are conventionally wound coils of a flat type of construction. They are firmly embedded together with their leads (not represented here) in the fiber composite material of the pipeline wall.

In the vicinity of the coils 16, 18, an electronic signal preprocessing and signal transmission assembly 22 is also embedded in the layers. Similarly, there are measuring signal leads (not represented here) from the signal preprocessing assembly 22 to the electrode system. Signal lines 24 are led to the outside from the signal preprocessing assembly 22. Connected to these lines is a transmitter assembly 26, by means of which a link is established from the measuring location 2 to a central process control and management unit 28 via a field bus system 30. The process control unit 28 thereby comprises at least one process computer.

The flow measuring system according to FIG. 1 comprises a conductive signal pickup. For this purpose, a pair of electrodes, of which only one electrode 32 is represented in FIG. 1, are integrated in the inner wall of the pipeline. As known in the case of magnetic-inductive measuring systems, the measuring electrodes 32 are arranged in such a way that their connecting line is perpendicular to the direction of the magnetic field B generated by the exciting coils 16, 18. All further additional devices that are known and usually present in the case of magnetic-inductive measuring devices, for example grounding electrodes for the contacting of the fluid or shielding electrodes, are present in the flow meter according to FIG. 1, but are not represented here. This also applies to the signal lines from the measuring electrodes 32 to the signal preprocessing assembly 22.

To produce a flow meter according to the invention as shown in FIG. 1, methods are borrowed from the production technique known per se for components of fiber-reinforced plastics, in particular the winding method. Typically, process steps described below are thereby taken.

Firstly, a first, inner layer is wound onto a cylindrical core, for example made of aluminum. This may consist either of resin-impregnated fibers in the form of what is known as a roving or of a semifinished fiber material, for example in the form of a cut-to-size scrim with suitable individual fiber layers. Also, a liner layer, for example of Teflon, could also first be applied, and then the first layer of resin-impregnated fibers could be applied on top of that.

The measuring electrodes are also already provided at this stage. On this first layer, several further layers are wound, covering over the measuring electrodes, the leads to the measuring electrodes being fixed. After winding in shielding electrodes, the wall is covered by several further layers.

Next, the parts of the magnetic system, namely the ferromagnetic core and the exciting coils, are then fixed and subsequently wound in and finally secured. The exciting coils 16, 18 are provided in such a way that the magnetic field in the space inside the pipe extends perpendicularly to the center axis 4 of the pipe and perpendicularly to the connecting line between the measuring electrodes 32, as indicated in FIG. 1 by the arrows B.

As far as the magnetic system is concerned, very high positioning accuracy is important, in particular little turning, if high measuring accuracy is to be achieved. With appropriately careful winding, the achievable geometrical precision is very high. In this way, turning of the coils and of the core can be restricted to less than one degree.

After several further layers, the signal preprocessing assembly 22 is fixed and wrapped with further layers. The wrapping of the magnetic system 14 and the signal preprocessing assembly 22 is in this case locally confined to the portion of the piece of pipeline 1 that forms the measuring location. In this portion, the pipeline wall is somewhat thicker than in the remaining part of the piece of pipeline.

Toward the outside, a shielding layer 34 of conductive material, for example of a semifinished fiber material comprising electrically conductive material, such as for example conductive carbon fibers, may also be wound on, and this layer again wrapped with several final outer protective layers. Similarly, the measuring electrodes 32 could also have been built up at the beginning of the production process from pieces of electrically conductive carbon fibers.

The transmitter assembly 26 may already include diverse functional subassemblies for signal processing, for further filtering, intermediate storage and transmission—either by means of bus cables, in which case it comprises corresponding assemblies for realizing the respectively required bus transmission protocol, or else for wireless transmission by means of a radio transmitter.

Finally, as the last step, the core is removed again, in that it is pulled out from the fully cured piece of pipeline. Known techniques, such as for example heating the core, may be used here to assist.

One variant of the production method is that of using a cylindrical tube of liner material, for example of Teflon or thermoplastic, as the core. The tube may be brought into the required cylindrical form for example by exposure to compressed gas. After applying the fiber composite material with all the embedded components and subsystems to the liner, the liner core is then removed again by pulling it out.

In a further embodiment, not represented here, the liner remains inside the piece of pipeline 1 after application of the layers of fiber composite material.

In FIG. 2, a second embodiment of a magnetic-inductive flow measuring system according to the invention is shown, parts or assemblies that are the same or have the same effect bearing the same designations as in FIG. 1, but with the letter A added.

In the representation of FIG. 2, the flow measuring system according to the invention is shown in cross section. The difference from the exemplary embodiments shown in FIG. 1 is that, in the embodiment according to FIG. 2, the signal pickup is performed by capacitive means. For this purpose, in the production of the piece of pipeline 1a, capacitive electrodes 36 are wound in at a small distance from the inner surface of the pipe, and corresponding shielding electrodes 38 are wound in toward the outside. The use of shielding electrodes and the basic construction of a capacitive signal recording system in connection with a magnetic-inductive flow measuring system are otherwise known in principle.

FIG. 3 shows a schematic, exemplary representation of a process engineering plant with a pipeline system 40, in which flow measuring locations have in each case been created on four pieces of pipeline 42, 44, 46, 48 by flow meters according to the invention. The designations 42, 44, 46, 48 are therefore also used hereafter for designating the flow measuring locations.

The schematic, exemplary representation of a process engineering plant comprises a storage tank 50, in which a liquid substance is stored. The liquid substance is passed through the pipeline system 40 from the storage tank 50 into two reactors 52, 54. In each of the reactors, the substance is processed into different end products, and subsequently stored and kept in intermediate storage tanks 56, 58.

Apart from the already mentioned pieces of pipeline 42, 44, 46, 48 bearing the measuring locations, the pipeline system 40 also comprises pipe bends 60, T pieces 62 as well as straight pieces of pipe 64. All the parts of the pipeline system 40 that are used are produced from fiber composite material, since the substance to be processed in the plant is particularly corrosive and chemically aggressive.

The pieces of pipeline 42, 44, 46, 48 forming the measuring locations are in each case constructed as described with reference to FIGS. 1 and 2. All the pieces of pipeline forming the pipeline system 40 are connected to one another by known fiber composite material techniques at connecting locations 66 indicated by dashed lines.

The signal lines 24, 24', 24", 24''' of the pieces of pipe 42, 44, 46, 48 are connected to a field bus system 30, to which the process control and management unit 28a, with the process computer integrated in it, is also connected. In the process control unit 28a, the evaluation and further processing of the flow data supplied from the process pipe system 40 by means of the flow meters according to the invention is performed, for example for balancing, quality monitoring or the like.

It is clear from FIG. 3 that, with the construction of the process pipeline system 40, the flow meters are also immediately constructed and installed, without any need for renewed mechanical intervention in the pipeline system. It goes without saying that the process engineering plant that is shown schematically and by way of example in FIG. 3 is only an example of the flow meter according to the invention that can otherwise be used in virtually all conceivable process engineering plants.

List of Designations

| | |
|---|---|
| 1, 1a | piece of pipeline |
| 2, 2a | measuring location |
| 4, 4a | center axis of pipe |
| 10, 10a | layer of fiber semifinished material |
| 12, 12a | synthetic resin |
| 14, 14a | magnetic system |
| 16, 18, 16a, 18a | exciting coil |
| 20, 20a | ferromagnetic core |
| 22, 22a | signal preprocessing unit |
| 24, 24', 24", 24''' | signal line |
| 26, 26a | transmitter assembly |
| 28, 28a | process control and management unit |
| 30, 30a | field bus system |
| 32 | measuring electrode, conductive |
| 34 | shielding layer |
| 36a | measuring electrode, capacitive |
| 38a | shielding electrodes |
| 40 | process pipeline system |
| 42, 44, 46, 48 | measuring locations |
| 50 | storage tank |
| 52, 54 | reactors |
| 56, 58 | intermediate storage tanks |
| 60 | pipe bend piece |
| 62 | T piece |
| 64 | straight piece of pipe |
| 66 | connecting locations |

The invention claimed is:

1. A flow meter for measuring the flow of a fluid, the flow meter comprising:
   a pipeline formed of a plastic fiber composite material and produced by a winding technique;
   an electrode arrangement integrated in the pipeline;
   a magnetic system integrated in the pipeline for generating the measuring magnetic field; and
   an electronic signal converter and/or signal transmission assembly integrated in the pipeline.

2. The flow meter as claims in claim 1, wherein the electrode arrangement comprises conductive regions of the pipeline bounding surface on a substance side.

3. The flow meter as claimed in claim 1, wherein the magnetic system is wound into a pipe wall during the production of the pipeline.

4. The flow meter as claimed in claim 3, wherein an electrode arrangement is wound into the pipe wall during the production of the pipeline.

5. The flow meter as claims in claim 1, the magnetic system being wound into layers of fiber composite material subsequently applied to an existing pipeline.

\* \* \* \* \*